(12) United States Patent
Chauhan et al.

(10) Patent No.: US 12,481,814 B1
(45) Date of Patent: Nov. 25, 2025

(54) PERFORMING AUTOMATIC SIGN-OFF FOR CLOCK GATING VERIFICATION USING TOGGLE COVER PROPERTIES

(71) Applicant: Synopsys, Inc., Mountain View, CA (US)

(72) Inventors: Nishant Chauhan, Kurukshetra (IN); Sudipta Kundu, Portland, OR (US); Hanish Singla, Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 592 days.

(21) Appl. No.: 17/987,123

(22) Filed: Nov. 15, 2022

Related U.S. Application Data

(60) Provisional application No. 63/280,040, filed on Nov. 16, 2021.

(51) Int. Cl.
| *G06F 30/3323* | (2020.01) |
| *G06F 30/20* | (2020.01) |
| *G06F 30/3312* | (2020.01) |
| *G06F 30/367* | (2020.01) |
| *G06F 30/396* | (2020.01) |

(52) U.S. Cl.
CPC .......... *G06F 30/3323* (2020.01); *G06F 30/20* (2020.01); *G06F 30/3312* (2020.01); *G06F 30/367* (2020.01); *G06F 30/396* (2020.01)

(58) Field of Classification Search
CPC .. G06F 30/3323; G06F 30/20; G06F 30/3312; G06F 30/367; G06F 30/396
USPC ............. 716/107, 108, 113, 136; 703/16, 19
See application file for complete search history.

(56) References Cited

U.S. PATENT DOCUMENTS

| 7,500,205 | B2* | 3/2009 | Paul | H03K 5/135 |
| | | | | 716/108 |
| 7,958,476 | B1* | 6/2011 | Jiang | G06F 30/327 |
| | | | | 716/109 |
| 9,152,742 | B1* | 10/2015 | Gupta | G06F 30/3315 |
| 10,296,686 | B1* | 5/2019 | Krishnamurthy | G06F 30/327 |
| 10,503,243 | B1* | 12/2019 | Beletsky | G06F 1/3287 |
| 2008/0016480 | A1* | 1/2008 | Gass | G06F 30/3312 |
| | | | | 716/108 |
| 2013/0305203 | A1* | 11/2013 | Soni | G06F 30/394 |
| | | | | 716/115 |

(Continued)

FOREIGN PATENT DOCUMENTS

JP       4729007 B2 *  7/2011   .............. G06F 30/33

OTHER PUBLICATIONS

Han, "IC Physical Design Methodologies for Advanced Process Nodes", University of California, San Diego, 2018, 240 pages. (Year: 2018).*

*Primary Examiner* — Phallaka Kik
(74) *Attorney, Agent, or Firm* — Fenwick & West LLP

(57) ABSTRACT

A method or system for clock gating verification of a circuit design. The system identifies a set of sequential components of the circuit design, and a set of nets of the circuit design. Each net is configured to provide a signal to a clock pin of a sequential component. The system then identifies a subset of nets that are associated with toggle signals, each of which transitions between two different signal values. For each of the subset of nets, the system determines one or more toggle cover properties. The system also determines a depth of at least one net in the subset of nets, and performs sign off for the clock gating verification based on the toggle cover properties and the depth of the at least one net.

20 Claims, 12 Drawing Sheets

(56) References Cited

U.S. PATENT DOCUMENTS

2016/0301414 A1* 10/2016 Olbrich .............. H03K 19/0175

* cited by examiner

PERFORMING AUTOMATIC SIGN-OFF FOR CLOCK GATING VERIFICATION USING TOGGLE COVER PROPERTIES

CROSS REFERENCE TO RELATED APPLICATIONS

This application claims priority under 35 U.S.C. § 119 (e) to U.S. Provisional Patent Application Ser. No. 63/280,040, entitled "Performing Automatic Sign-off For Clock Gating Verification Using Toggle Cover," filed Nov. 16, 2021, which is incorporated herein by reference in their entirety.

TECHNICAL FIELD

The present disclosure relates to verification of circuit designs in general and more specifically to clock gating verification using toggle cover properties of the circuit design.

BACKGROUND

Clock gating is a technique used to reduce dynamic power dissipation in synchronous circuits. Clock gating may be performed by disabling the clock when the circuit is not in use. This saves power at the cost of adding more logic to the circuit and thereby increasing the area of the circuit. When clock-gating logic disables the clock portion of a circuit design, flip-flops or latches in these portions do not consume power as there is no switching of the states. Optimizations or transformations of clock gating result in modification of the circuit design. It can be computationally intensive to verify that the modified circuit design is equivalent to the original design.

SUMMARY

Embodiments described herein include a method or a system for verification of a circuit design having clock gating implemented thereon. The method includes identifying a set of sequential components of the circuit design. A sequential component may be a flip-flop or a latch. A set of nets of the circuit design is identified. A net in the set of nets provides a signal to a clock pin of a sequential component in the set of sequential components. A subset of nets in the set of nets that provide toggle signals is identified. The nets of the subset transition between two different signal values, such as from a signal value of 0 to a signal value of 1, or from a signal value of 1 to a signal value of 0. For each net in the subset of nets, one or more toggle cover properties for the net are determined. A depth of a net in the subset of nets is determined. Sign off is performed based on the toggle cover properties and the depth of the net.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments.

DETAILED DESCRIPTION

Sequential equivalence checking (SEQ) is used for clock gating verification between a reference register-transfer-level (RTL) design and another RTL design (e.g., a power-optimized design) containing integrated clock gating (ICG) cells. Existing clock gating verification based on SEQ can be computationally intensive. It may also become difficult for a formal verification system to prove these properties, and several of the properties may be inconclusive.

Embodiments described herein introduce an improved SEQ-based clock gating verification of circuits, quantifying the quality of verification using toggle cover properties to reduce computation intensity. The system compares two RTL designs and verifies that they are equivalent on a cycle-to-cycle basis. The circuit designs may be written in various design languages, such as synthesizable Verilog, SystemVerilog or VHDL. The system verifies that the behavior of modified design matches the behavior of the original design. The system uses SEQ for clock gating verification and quantifies the quality of verification by tracking toggle coverage of the unique non-primary clock nets in the fan-in of ICG cells. There are three possible outcomes of a clock-gating verification using SEQ. The outcomes include the reference RTL design and the compared RTL design are (1) NOT sequentially equivalent (also referred to as having "proven status"), (2) sequentially equivalent (also referred to as having "falsified status"), or (3) unknown (also referred to as having "inconclusive status"). Sign-off involves quantifying these results for the correctness of the clock-gating functionality.

The techniques disclosed herein improve the performance of the clock gating process by performing verification using SEQ and quantifying the quality of verification using toggle cover properties. Each toggle cover property has a value of (1) a covered status, indicating that the net can transition from a first value to a second value, (2) an uncovered status, indicating that the toggle signal of the net is never transitioning between two values, or (3) an inconclusive status, indicating that it is unknown whether the toggle signal of the net can transition between two values. Additional details about SEQ and toggle cover properties are further discussed below with respect to FIGS. 1A-7.

Figure 1A:
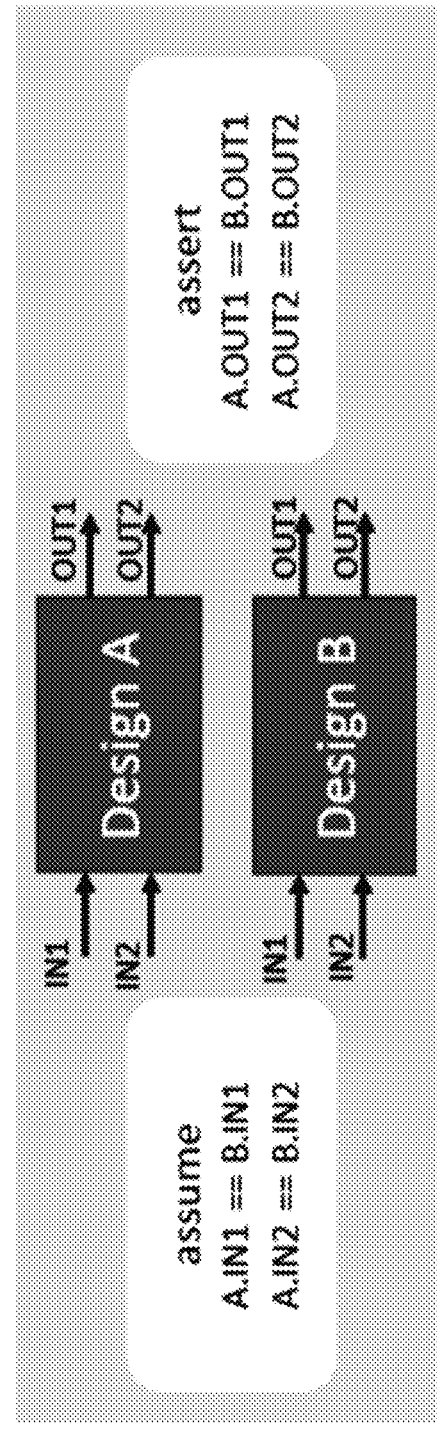
FIG. 1A illustrates an example process of sequential equivalence checking (SEQ), in accordance with some embodiments.

FIG. 1A illustrates an example process of SEQ 100A. The SEQ 100A checks whether design A and design B are equivalent. If SEQ 100A proves the various assertions, design A and design B are deemed as equivalent. If SEQ 100A falsifies the assertions, SEQ 100A generates a counter-example to debug the reason for the falsification, which can then be used to further determine if the problem is caused by the RTL design or in the setup. SEQ may also yield an inconclusive result, for example, if the problem is too large or complex, given the available memory and/or runtime resources.

Figure 1B:
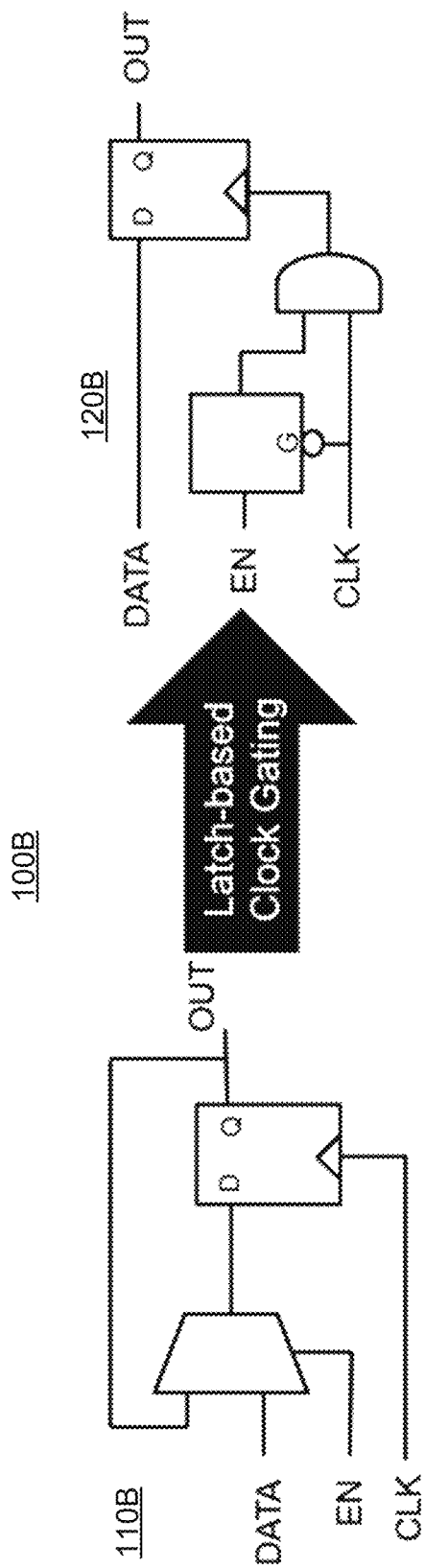
FIG. 1B illustrates an example transformation that transforms a first design without any integrated clock gating to a second design with latch-based clock gating, in accordance with some embodiments.

FIG. 1B illustrates an example transformation 100B that transforms a first design 110B without any ICG to a second design 120B with latch-based clock gating. As shown in FIG. 1B, the second design 120B adds a latch to the first design 110B to hold an enable signal from an active edge of the clock until an inactive edge of the clock.

Figure 1C:
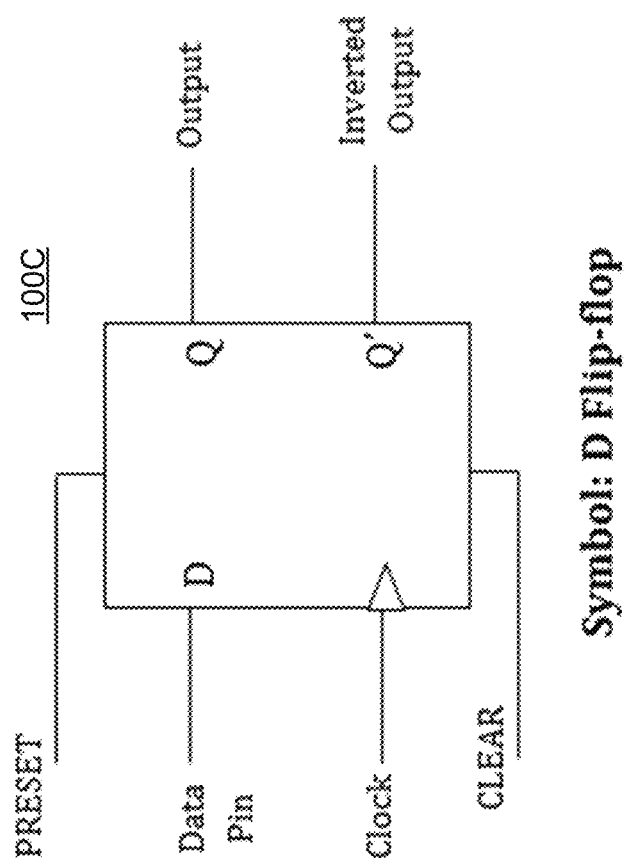
FIG. 1C illustrates an example flip-flop, in accordance with some embodiments.

An RTL design may have many flip-flops and latches, each of which is referred to herein as sequential or a sequential component. FIG. 1C illustrates an example D (or delay) flip-flop 100C. The D flip-flop 100C includes a data input pin (denoted as D), a clock input pin (denoted as CLK), an output pin (denoted as Q), and an inverted output pin (denoted as Q'). The D flip-flop 100C may be used to delay the change of state of its output signal Q until a next rising edge of a clock timing input signal occurs. For example, when D is 0, CLK has a rising edge, Q is 0; when D is 1, CLK has a rising edge, Q is 1. As such, the D flip-flop 100C may act as an electronic memory component since the output remains constant unless deliberately changed by altering the state of the D input followed by a rising edge signal.

Each sequential (such as the D flip-flop 100C) has a clock driving its values. A primary net (e.g., a clock) refers to a net that is specified (e.g., by a user) that serves as a clock for sequentials. Sequential depth implies how many sequentials are required to pass while traversing in a fan-in of a clock pin of a given sequential.

Figure 2:
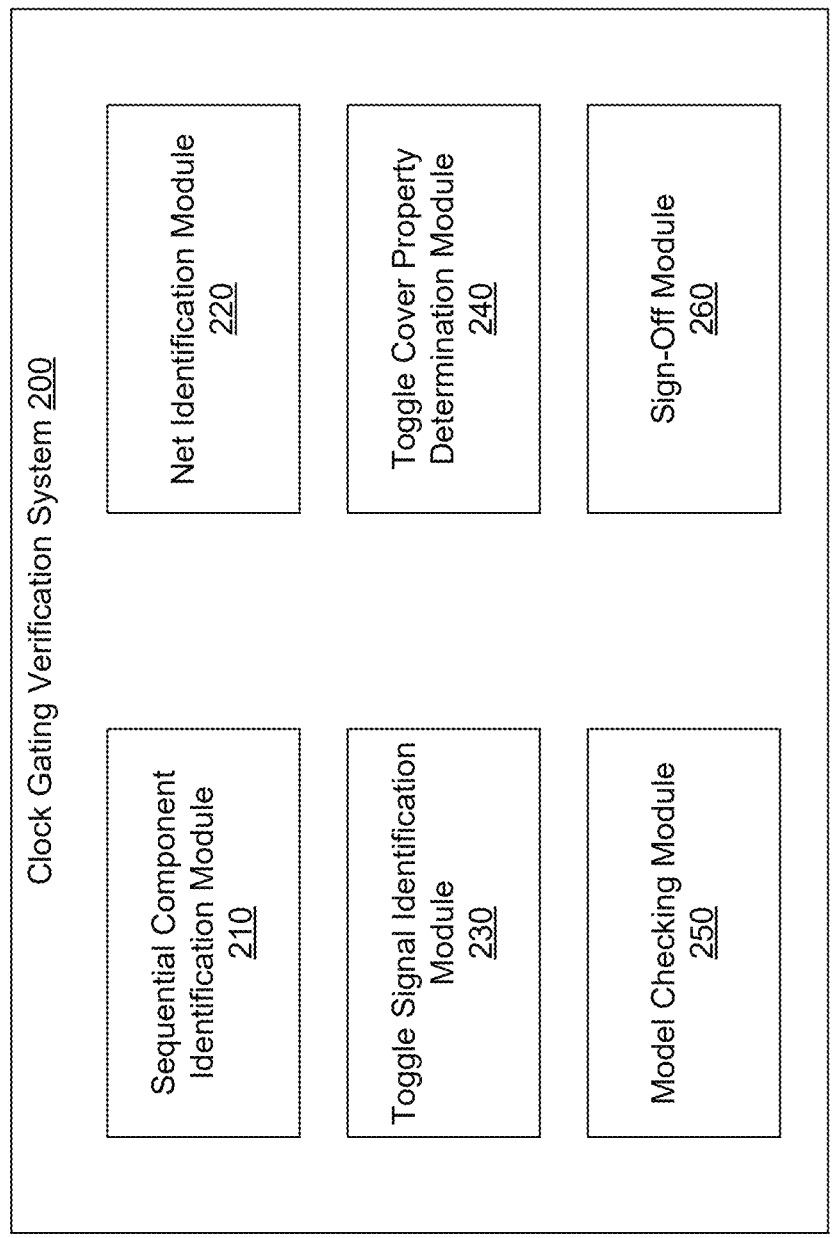
FIG. 2 illustrates an example architecture of a clock-gating verification system that implements the principles described herein, in accordance with some embodiments.

Embodiments described herein include a method or a system for clock gating verification of circuit design using SEQ. FIG. 2 illustrates an example architecture of a clock gating verification system 200, in accordance with some embodiments. The clock gating verification system 200 includes a sequential component identification module 210, a net identification module 220, a toggle signal identification module 230, a toggle cover property determination module 240, a model checking module 250, and a sign-off module 260. In some embodiments, the clock gating verification system 200 may also have additional functions, such as (but not limited to) displaying, editing, or generating circuit designs. In some embodiments, one or more of the modules 210-260 may be separated into more modules, and/or combined into fewer modules. In some embodiments, modules 210-260 are implemented by a processor or a processing device via executing instructions.

The sequential component identification module 210 is configured to identify a set of sequential components in a circuit design having clock gating logic added. Each sequential component may be a flip-flop or a latch.

The net identification module 220 is configured to identify a set of nets in the circuit design (e.g., an RTL design). Each net is configured to provide a signal to a clock pin of a sequential component in the set of sequential components. In some embodiments, the set of nets is a set of unique non-primary clock nets. A unique net refers to a net with a functional value that is different from other nets. A non-primary clock net refers to a net that is not a primary clock net. Each net in the set of nets is configured to provide a signal to a clock pin of a sequential component in the set of sequential components. In some embodiments, identifying the set of nets includes identifying a set of primary clocks and primary inputs, and determining whether a net providing a signal to a clock pin of a sequential component is in the set of primary clocks or primary inputs. Responsive to determining that the net is not in the set of primary clocks or primary inputs, the net is added to the set of nets. In some embodiments, identifying the set of nets include traversing the circuit design up to a depth of a threshold number of sequential components relative to a particular sequential component to identify non-primary nets that are not in the set of primary clocks or primary inputs. In some embodiments, identifying the set of nets further includes determining that a net is equivalent to at least another net in the set of nets, and eliminating the equivalent net from the set. In some embodiments, a pair of nets is equivalent if the pair of nets have matching functional values.

The toggle signal identification module 230 is configured to identify a subset of nets in the set of nets that provide toggle signals. Each toggle signal transitions between two different signal values, such as from logic 0 to 1, or from logic 1 to 0.

The toggle cover property determination module 240 is configured to determine one or more toggle cover properties for each of the subset of nets. Each toggle cover property has a value of (1) a covered status, indicating that the net can transition from a first value to a second value, (2) an uncovered status, indicating that the toggle signal of the net is never transitioning between two values, or (3) an inconclusive status, indicating that it is unknown whether the toggle signal of the net can transition between two values.

The model checking module 250 is configured to determine a depth of at least one net in the subset of the nets. The sign-off module 260 is configured to perform sign off for the clock gating verification based on the toggle cover properties and the depth of the at least one net. In some embodiments, the sign-off module 260 is configured to determine whether a criterion associated with toggle cover properties and the depth of the at least one net is satisfied, and perform sign off only when the criterion is satisfied. Here, "sign off" indicates that the two RTL designs have met a threshold of verification standard, and/or the two RTL designs are deemed to be functionally equivalent.

In some embodiments, responsive to determining that the toggle cover properties and the depth of the at least one net do not satisfy the criterion, for a net in the subset of nets that has the covered status or uncovered status, at least one toggle signal in the net of toggle signals that is contributing to the covered status or the uncovered status is identified.

In some embodiments, the sign off module 260 is further configured to determine a maximum depth of properties that have the covered status. In some embodiments, the sign off module 260 is further configured to determine a minimum depth of SEQ assert properties that have the inconclusive status.

Figure 3:
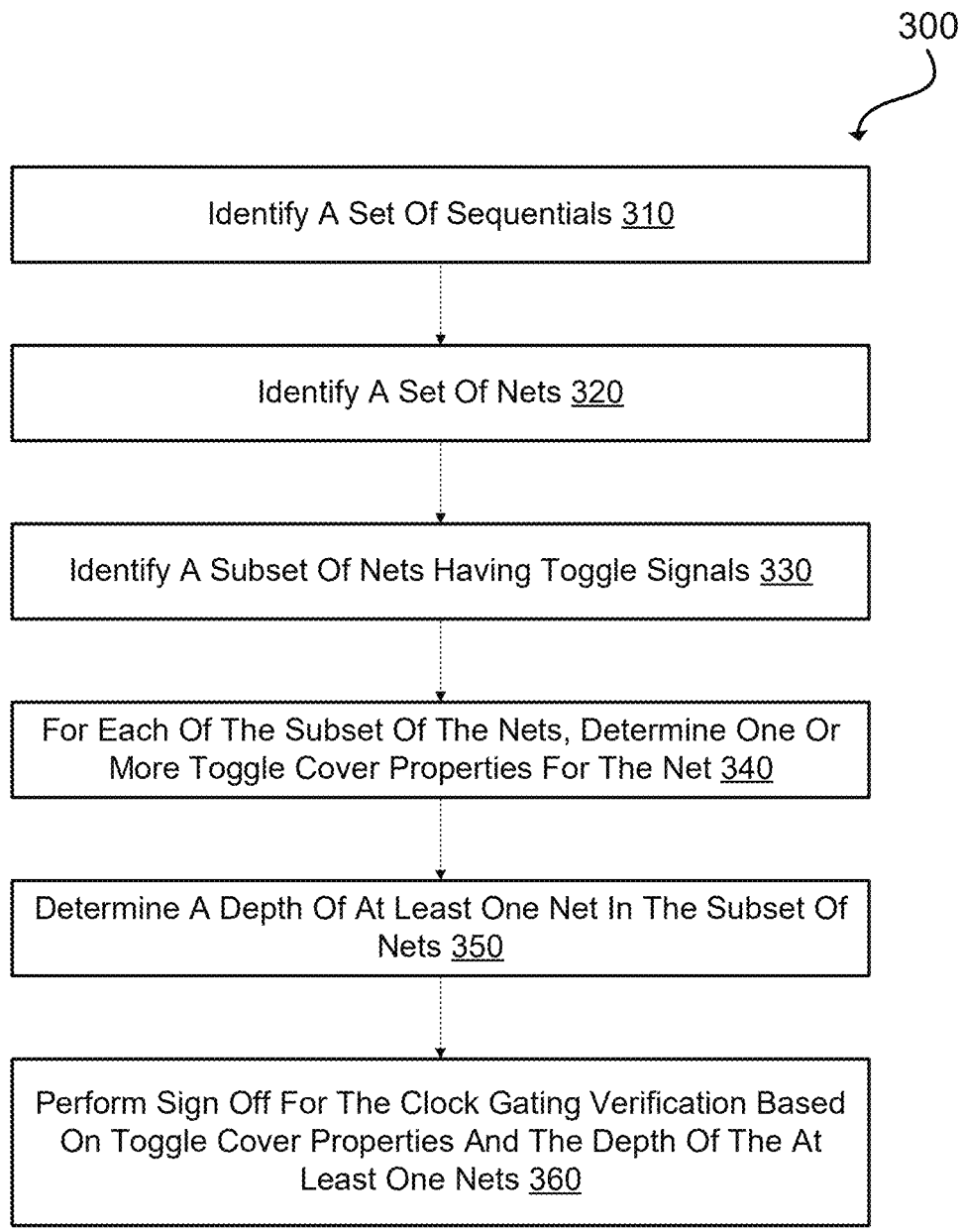
FIG. 3 illustrates a flowchart of an example method for clock-gating verification, in accordance with some embodiments.

FIG. 3 is a flowchart of an example method 300 for clock gating verification of circuit design using SEQ. The method 300 may be implemented by a computing system, such as the clock gating verification system 200 of FIG. 2.

As illustrated in FIG. 3, the computing system identifies 310 a set of sequential components in a circuit design having clock gating logic added. The computing system also identifies 320 a set of nets in the circuit design. Each net provides a signal to a clock pin of a sequential component in the set of sequential components. The computing system also identifies a subset of nets 330 having toggle signals. Each toggle signal transitions between two different signal values, such as from logic 0 to logic 1, or from logic 1 to logic 0. The computing system also determines 340 one or more toggle cover properties for each of the subset of nets. Each toggle cover property provides an indication of whether the toggle signal of the net is observed. The computing system also determines 350 a depth of at least one net in the subset of nets. The computing system performs 360 sign off for the clock gating verification based on the toggle cover properties and the depth of the at least one nets.

Figure 4:
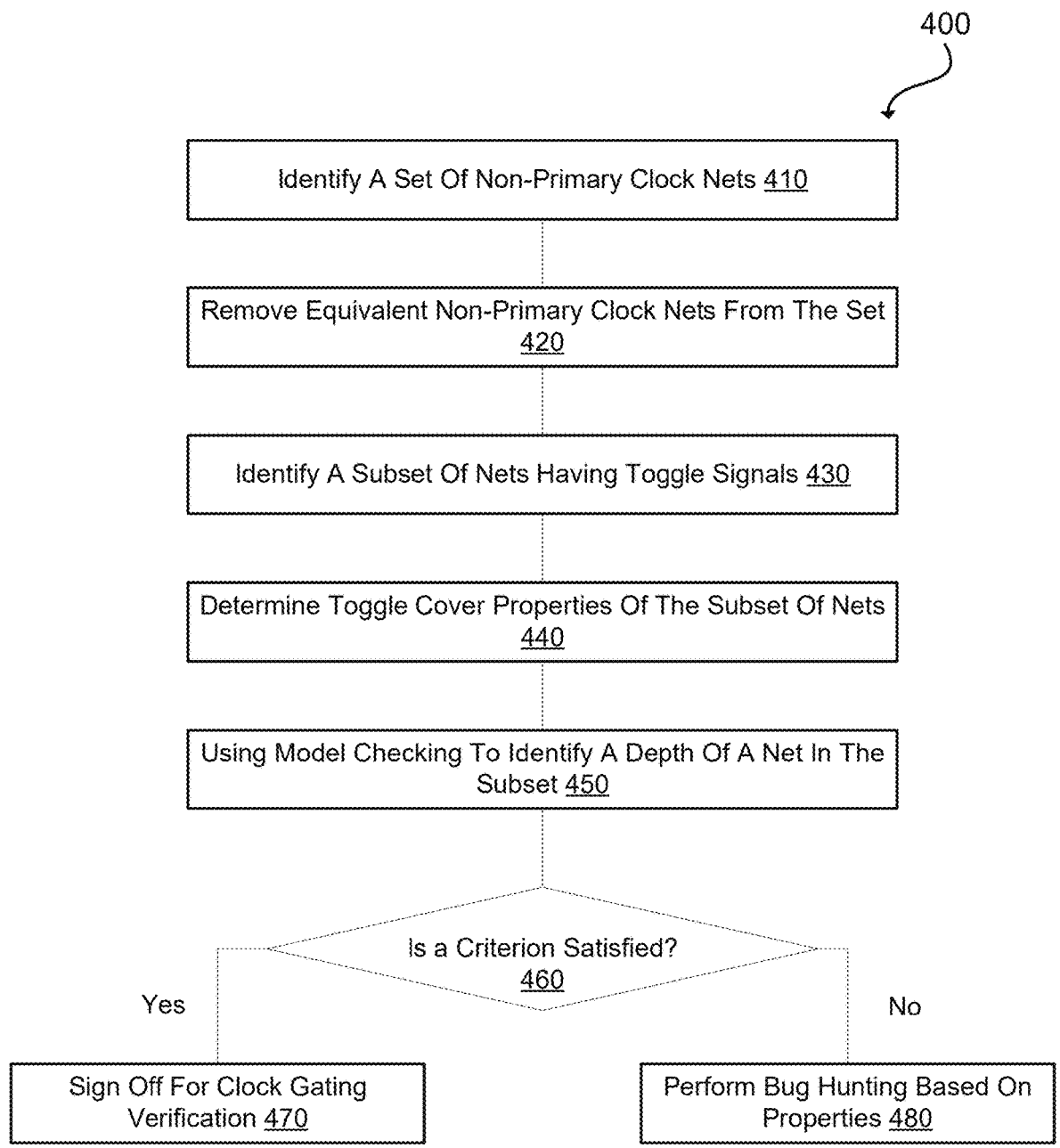
FIG. 4 is a flowchart of another example method for clock-gating verification, in accordance with some embodiments.

FIG. 4 is a flowchart of another example method 400 for clock gating verification of circuit design using SEQ, in accordance with some embodiments. The method 400 may also be performed by a computing system, such as the clock gating verification system 200. First, the computing system identifies 410 all the non-primary clock nets. Additional details related to identification of non-primary clock nets are further described below with respect to FIGS. 5-6A. The system then identifies unique non-primary clock nets 420 among all the non-primary clock nets. Additional details related to identification of unique non-primary clock nets are further described below with respect to FIGS. 6B-7.

The computing system also identifies 430 a subset of unique non-primary clock nets having toggle signals, and determines 440 toggle cover properties of the subset of nets. The computing system then checks 450 the toggle cover properties using model checking to identify depths of at least one net in the subset. The computing system then determines 460 whether a criterion is satisfied. The criterion is associated with the toggle cover properties and the depth of the at least one net. In one embodiment, the criterion requires that a minimum bounded depth of inconclusive SEQ assert properties should at least be greater than the maximum depth of the toggle cover properties plus the sequential depth of the design. The minimum bounded depth of inconclusive SEQ assert properties is defined as a minimum depth among all inconclusive SEQ properties of the original CG verification.

Responsive to determining that the criterion is satisfied, the computing system signs off 470 for clock gating verification; otherwise, the computing system performs 480 bug hunting on the toggle cover properties. Bug hunting is a technique that requires writing targeted internal or interface assertions or end-to-end checkers to verify specific functionality of a system. This technique can be very effective in uncovering corner-case bugs in the design, although bug hutting generally cannot be used for sign-off. Another use case of the toggle properties is that they can be used for finding clock-gating bugs in the design. Formal verification tools can use these the toggle properties to target or focus its search for bug hunting.

Figure 5:
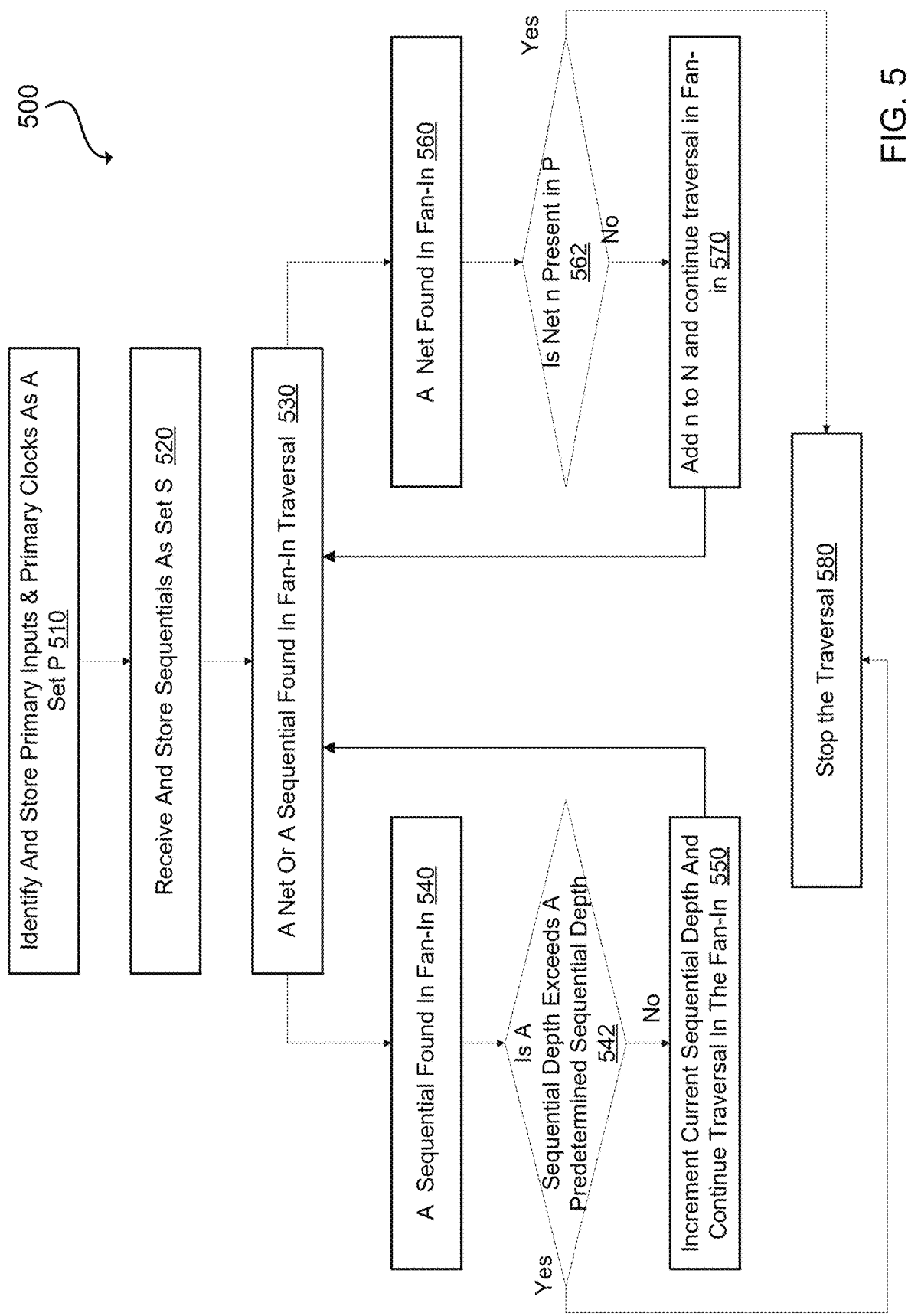
FIG. 5 illustrates a flowchart of an example method for identifying non-primary clock nets, in accordance with some embodiments.

FIG. 5 illustrates a flowchart of an example method 500 for identifying non-primary clock nets, which may correspond to act 410 of method 400 in FIG. 4. The goal of method 500 is to find non-primary clock nets that are present in a clock fan-in of a sequential, whose clock pin will act as a start net to begin a cone of influence (COI) traversal. Note, COI traversal is merely an example method of traversing the network. Other traversal methods, such as reverse-COI traversal, may also be implemented to traverse the network.

First, the computing system identifies and stores 510 primary inputs and primary clock nets of a design as a set P. The computing system also receives and stores 520 sequential components as a set S which may be based on a user input or based on the circuit design. In some embodiments, a sequential depth and/or a particular sequential may also be input by a user or automatically set by the computing system. For a given sequential depth, the computing system only traverses the design up to the sequential depth. For a given particular sequential, the computing system starts its traversal from the particular sequential.

In some embodiments, an initial current sequential depth may first be set to 0. The computing system then starts 530 traversing the design to find net n and/or sequential s. During the traversal process, the sequential depth increases as sequentials are found in fan-in. In some embodiments, when a sequential s is found 540 in fan-in, the computing system determines 542 if the current sequential depth exceeds a reference sequential depth. If the current sequential depth does not exceed the reference sequential depth, the computing system increases 550 the current sequential depth by one, and returns to 530 to traverse the design. If the current sequential depth exceeds the reference sequential depth, the computing system stops 580 the traversal. Alternatively, when no sequential is found, the computing system may continue to traverse the design until all the sequentials in the design are traversed.

When a net n is found 560 in fan-in, the computing system determines 562 if the net n is present in set P. If the net is not present in set P, the computing system adds 570 n in net set N and returns to 530. If the net is present in set P, the computing system stops 580 the traversal.

Figure 6A:
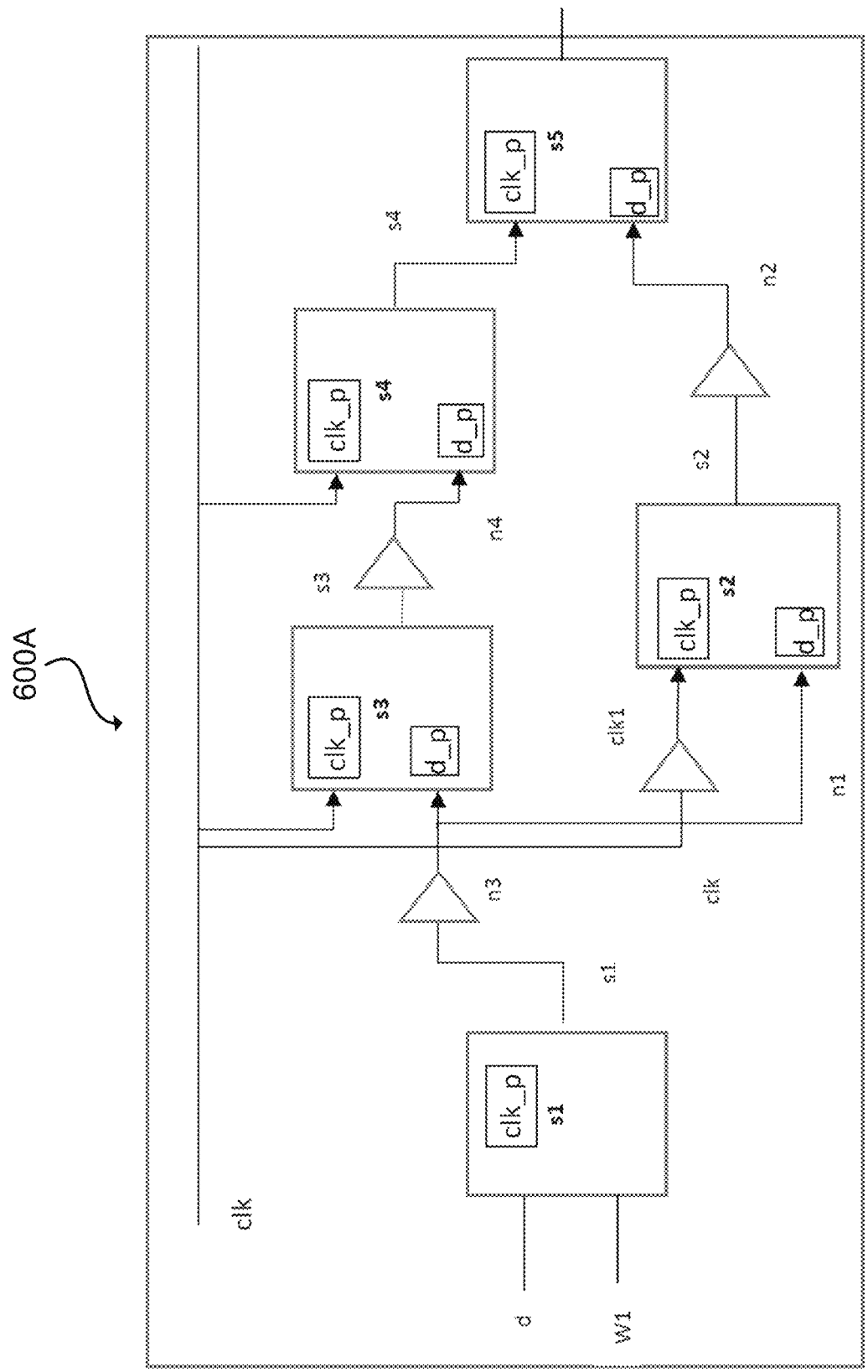
FIG. 6A illustrates an example design that is traversed to identify a set of nets, in accordance with some embodiments.

FIG. 6A illustrates an example design 600A that is traversed to identify nets N. The set P of primary clocks including the input net "clk" in FIG. 6A, represented as {clk}. Sequentials are labeled as s1, s2, s3, s4, and s5. If no sequential depth is given or no specific sequential is given, the present system selects all the sequentials from the design 600A, including s1, s2, s3, s4, and s5. The fan-in of the design 600A is then traversed from a clock pin of each of the sequentials to collect the non-clock nets. For s1, net d is identified. For s2, net clk1 is identified. For s3, no valid nets are identified because clock pin of s3 is directly connected to a primary clock clk. For s4, no valid nets are identified because clock pin of s4 is also directly connected to a primary clock clk. For s5, nets s4, n4, n3, s3, s1, w1, and d are identified.

Alternatively, if s5 is the sequential specified by a user, and a sequential depth is given as one, traversal would start from the clock pin of s5. The computing system would first identify s4, and continue to trace the fan-in of sequential s4. At this point, the current sequential depth is one since sequential s4 has been passed in the fan-in. Once s3 is reached, sequential depth will become 2 and traversal will stop. At this point, identified nets are s4, n4, and s3.

Notably, there could be nets that are passing through buffers, wires, and/or just crossing the module hierarchy where the functional values of the nets remain the same, except the names change under different scopes of hierarchies. Such nets are also referred to as equivalent nets. In some embodiments, equivalent nets encountered further in a traversal and equivalent to an identified net will be ignored. As such, only unique nets are collected.

Figure 6B:
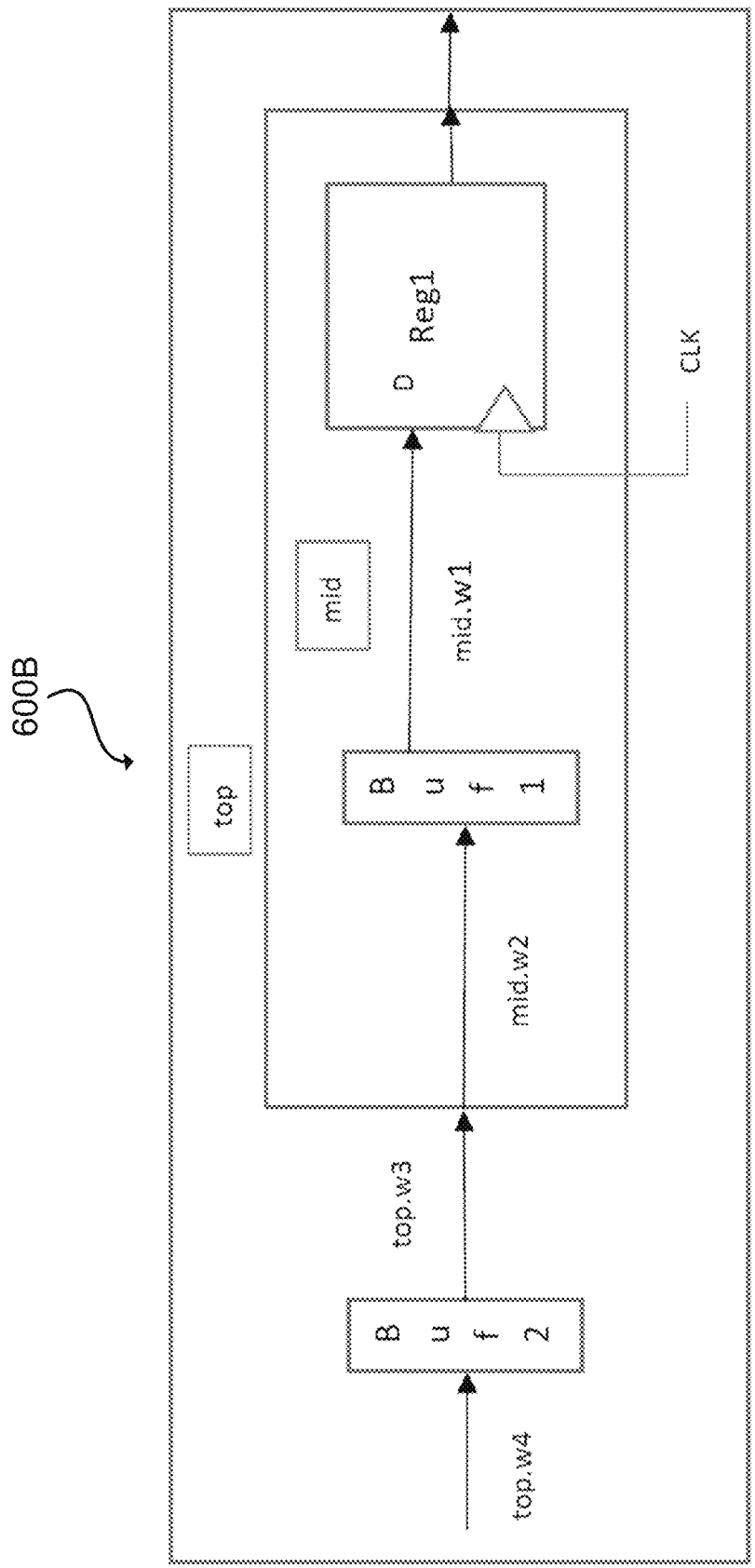
FIG. 6B illustrates an example design, in which only unique nets are collected, in accordance with some embodiments.

FIG. 6B illustrates an example design 600B, in which only unique nets are collected. Design 600B is under a "top" hierarchy. As illustrated, under "top", there is a "mid" hierarchy, which has a sequential Reg1 whose input D is going through buffers Buf1 under "mid" hierarchy and Buf2 under the "top" hierarchy. Assuming fan-in of the sequential Reg1 is to be traversed, the computing system would identify a set of nets, namely mid.w1, mid.w2, top.w3, and top.w4. In these identified set of nets, mid.w1 and mid.w2 pass through buffer Buf1. Thus, these nets are equivalent. Similarly, nets mid.w2 and top.w3 merely pass through hierarchies going from mid to top. Thus, they are also equivalent. Again, nets top.w3 and top.w4 merely pass through buffer Buf2. Thus, they are also equivalent. As such, all four of these nets belong to a same equivalence class, and only one of the four nets needs to be collected as a representative net.

Figure 7:
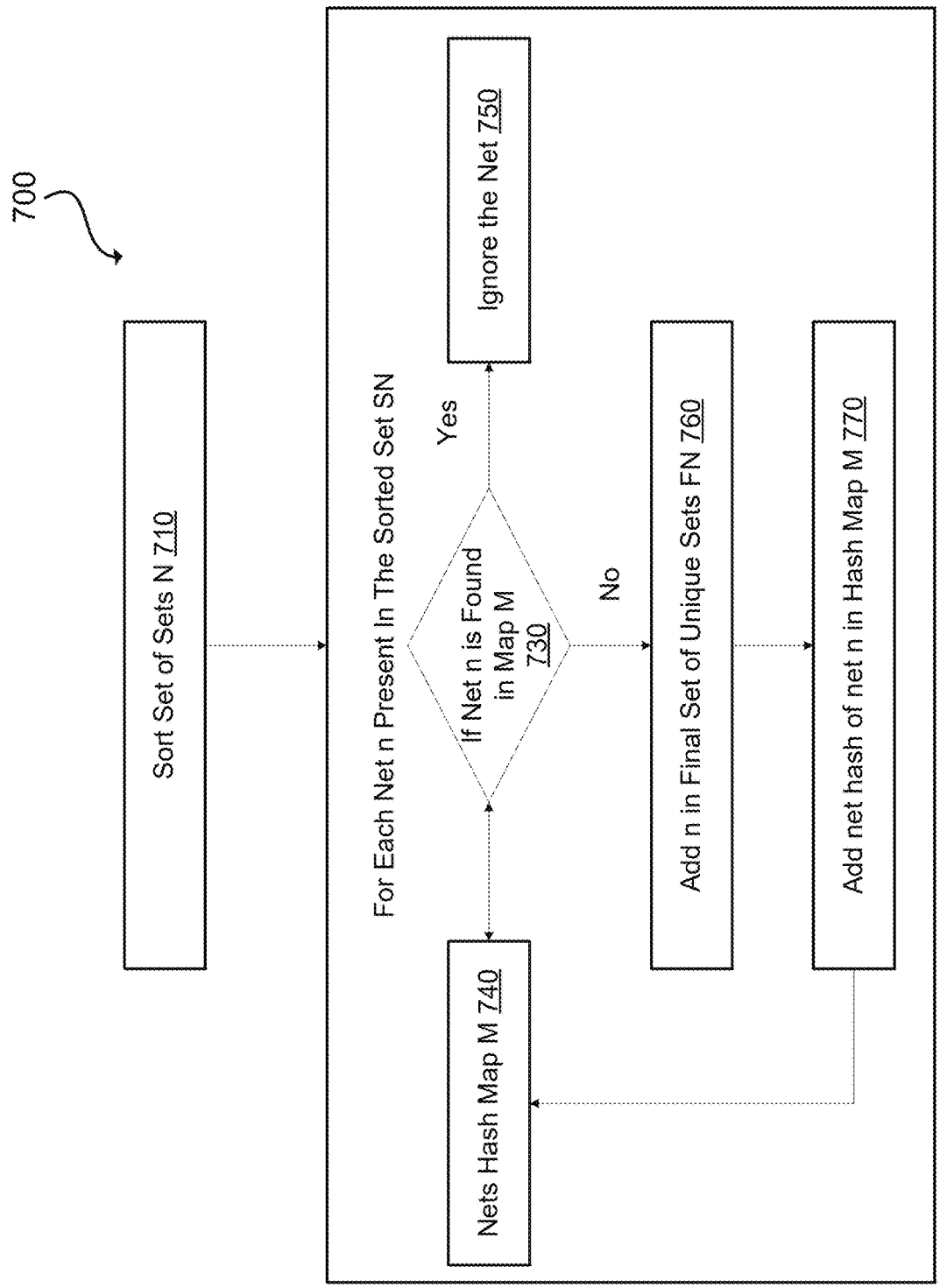
FIG. 7 illustrates a flowchart of an example method for removing equivalent net, in accordance with some embodiments.

FIG. 7 illustrates a flowchart of an example method 700 for removing an equivalent net, which corresponds to act 420 of FIG. 4. First, the computing system sorts 710 the set of nets (denoted as N) obtained from 410 of FIG. 4 or method 500. The sorting may be based on names of the nets, attributes, and identifiers of the nets. The sorted set of the net is denoted as SN. An equivalent net hash map 740 (denoted as M) is maintained to determine whether a net is equivalent to any other net. In particular, for each net n in the sorted net SN, it is determined 730 whether net n is found in the equivalent net hash map M. In some embodiments, certain properties associated with the net are used to generate a net hash, and the net hash is compared with existing hashes in the hash map M. If the net n is not found in the hash map M, net n is added 760 to the final set of unique sets (denoted as FN), and net hash n is added 770 into the map M. If the net n is found in the hash map M (indicating net n is already added to the final set FN), net n is ignored 750. After each of the net n in SN is processed, the resulting final set FN should include all the unique nets.

In some embodiments, the properties associated with the nets that are used to compute hash are associated with toggle properties. For example, if the net is toggling, a negation of it will also be toggling. As such, in some embodiments, a net is equivalent to the negation of the net. In some embodiments, nets that are going through a buffer are also equivalent to each other. A negation operation or a buffer are examples of equivalent nets and the equivalence determination may be applied to other operators of a circuit design.

Once the set of non-primary unique nets FN is identified and collected, the computing system is configured to determine which of these nets are contributing to making the ICG cells busy. For a net in the set of nets FN, if there are any toggle events (which are transitions of values of signals from value 1 to value 0 or from value 0 to value 1), that net becomes a candidate net and is deemed as contributing to activating the ICG cells. To identify all such nets, toggle cover properties of the nets associated with toggle events are determined.

In some embodiments, for each net, two toggle cover properties are determined: a toggle cover property toggle_n_0 represents a transition from value 0 to 1, and another toggle cover property toggle_n_1 represents a transition from value 1 to value 0. In some embodiments, toggle cover properties may be determined using model checking techniques. Each toggle cover property may be one of the following: (1) a covered status, indicating that the toggle signal of the net is activating the ICG cells, (2) an uncovered status, indicating that the toggle signal of the net never activates the clock gating logic, or (3) an inconclusive status, indicating that it is unknown whether the toggle signal of the net is activating the ICG cell. For each toggle cover property having a value of covered status or uncovered status, the model checking may also identify a list of signals that are contributing and making the ICG cells busy.

SEQ may then be used to perform clock gating verification between a reference design (without ICG cells) and a power-optimized design (with ICG cells). In particular, a criterion is associated with the clock gating (CG) cover properties of the none-primary unique nets FN. For example, the criterion may be that all the CG cover properties of the non-primary unique nets FN need to have a covered status, or a subset of them need to have a covered status. Alternatively, the criterion may also be associated with a depth of CG cover properties of the non-primary unique nets FN that have a covered status, and/or a depth of CG cover properties of the non-primary unique nets FN that have an inconclusive status.

When the criterion is satisfied, the SEQ signs off the design; otherwise, bug hunting is performed based on the toggle cover properties. Formal verification tools can use the toggle cover properties to target or focus their search for bug hunting.

A sequential depth of a design may be defined as a maximum delay of the design for its input to have an impact on the output. In some embodiments, for pure pipeline designs, the sequential depth is the pipeline depth of the design. A maximum CG cover depth is defined based on the following equation:

Maximum CG cover depth=maximum depth among all goal depth of covered toggle properties if all properties are covered, or Maximum CG cover depth=infinite, if count of uncovered toggle properties>0 or if count of inconclusive toggle properties>0.

In some embodiments, a sign-off criterion is defined based on the maximum CG cover depth. In some embodiments, the criterion includes that a minimum bounded depth of the inconclusive SEQ assert properties should at least be greater than the maximum depth of the CG cover properties plus the sequential depth of the design. Once the sign-off criterion is satisfied, the design is signed off automatically as having sufficiently correct clock-gating functionality.

Figure 8:
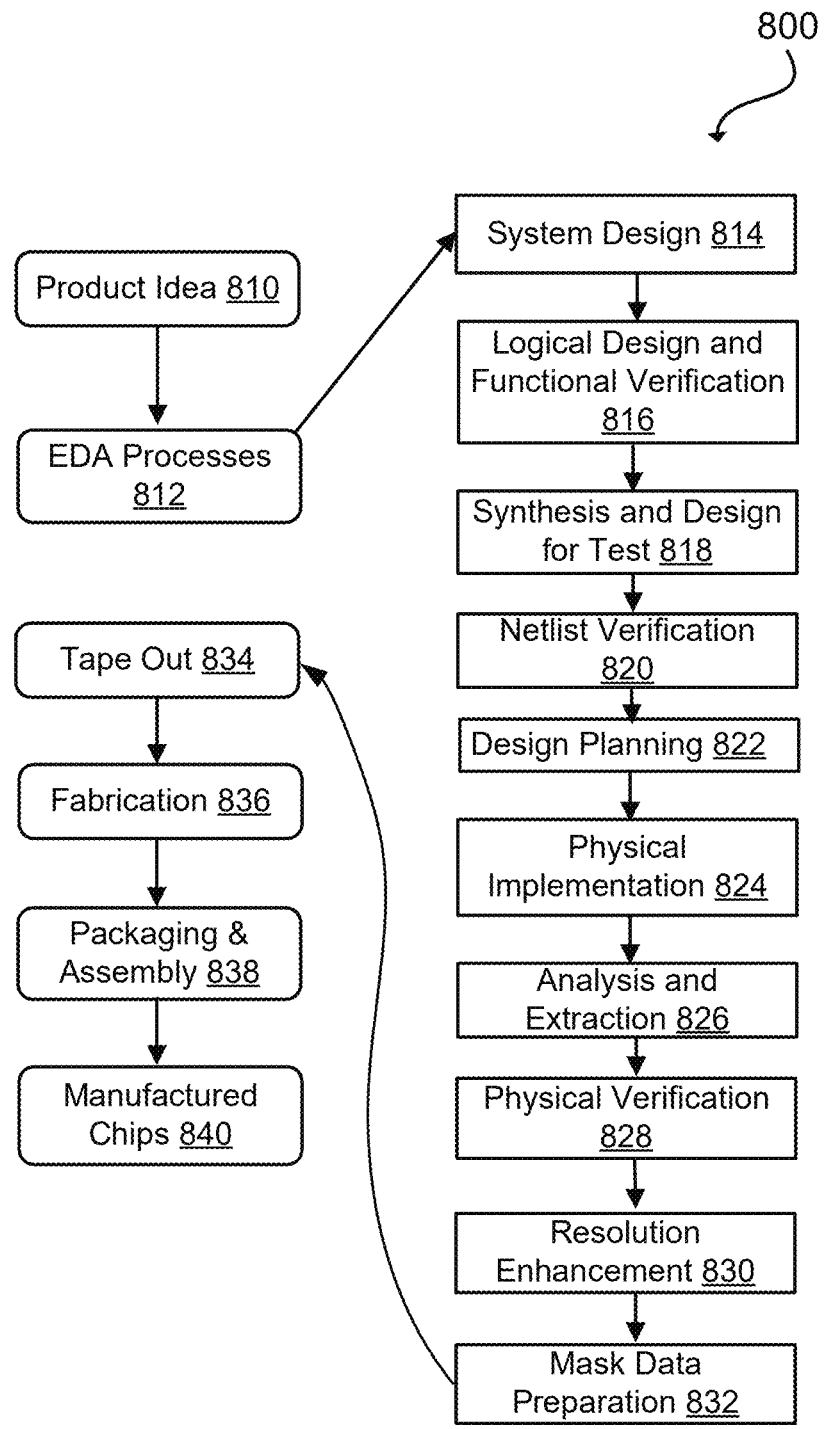
FIG. 8 illustrates an example set of processes used during the design, verification, and fabrication of an article of manufacture such as an integrated circuit to transform and verify design data and instructions that represent the integrated circuit.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more concrete description adds more useful detail into the design description, for example, more details for the modules that include the description. The lower levels of representation that are more concrete descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Figure 9:
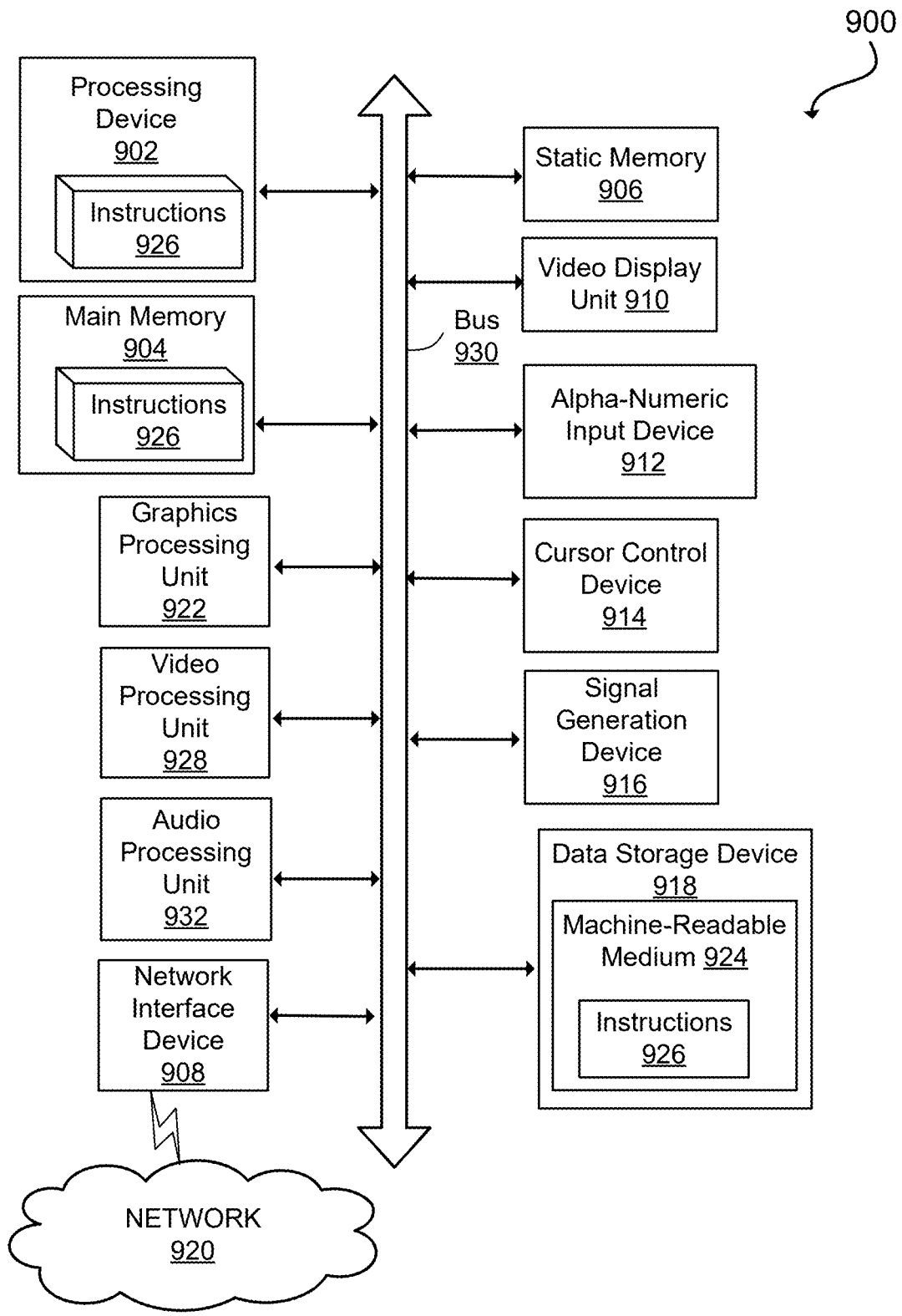
FIG. 9 illustrates an example machine of a computer system within which a set of instructions, for causing the machine to perform any one or more of the methodologies discussed herein, may be executed.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for verification of a circuit design having clock gating logic added, the method comprising:
    identifying a set of sequential components in the circuit design;
    identifying a set of nets in the circuit design, each net of the set of nets provides a signal to a clock pin of a sequential component in the set of sequential components;
    identifying a subset of nets in the set of nets that provide toggle signals, wherein the toggle signals transition between two different values;
    for each net in the subset of nets, determining one or more toggle cover properties for the net based on the toggle signals;
    determining a sequential depth of at least one net in the subset of nets;

performing, by a processing device, sign off for the verification of the circuit design based on the toggle cover properties and the sequential depth of the at least one net.

2. The method of claim 1, wherein at least one toggle cover property of a net in the subset of nets has a value of a covered status, indicating that the toggle signal of the net is activating the clock gating logic.

3. The method of claim 2, the method further comprising determining a maximum sequential depth of nets that have the covered status, wherein performing sign off for the clock gating verification is based on a criterion associated with the maximum depth of nets that have the covered status.

4. The method of claim 1, wherein at least one toggle cover property of a net in the subset of nets has a value of an uncovered status, indicating that the toggle signal of the net does not activate the clock gating logic.

5. The method of claim 1, wherein at least one toggle cover property of a net in the subset of nets has a value of an inconclusive status, indicating that it is unknown whether the toggle signal of the net is activating the clock gating logic.

6. The method of claim 1, the method further comprising:
performing sequential equivalence checking (SEQ) on the circuit design to determine SEQ assert properties of the circuit design; and
determining a minimum depth of SEQ assert properties that have inconclusive status, wherein performing sign off for the clock gating verification is further based on a criterion associated with the minimum depth.

7. The method of claim 1, wherein each toggle signal is a first signal that transitions from a signal value of 0 to a signal value of 1, or a second signal that transitions from a signal value of 1 to a signal value of 0.

8. The method of claim 7, wherein a net in the subset of nets includes a first toggle cover property associated with the first signal, or a second toggle cover property associated with the second signal.

9. The method of claim 1, identifying the set of nets comprising:
identifying a set of primary inputs;
determining whether a net providing a signal to a clock pin of a sequential component is in the set of primary inputs; and
responsive to determining that the net is not in the set of primary inputs, adding the net to the set of nets.

10. The method of claim 9, identifying the set of nets further comprising traversing the circuit design up to a depth of a threshold number of sequential components relative to a particular sequential component to identify non-primary nets that are not in the set of primary inputs.

11. The method of claim 1, identifying the set of nets further comprising:
determining that a net is equivalent to at least another net in the set of nets; and
eliminating the equivalent net from the set.

12. The method of claim 11, wherein a pair of nets are equivalent if the pair of nets have matching functional values.

13. A non-transitory computer readable medium comprising stored instructions, which when executed by a processor, cause the processor to perform:
identify a set of sequential components in a circuit design having clock gating logic added thereon;
identify a set of nets in the circuit design, each net of the set of nets provides a signal to a clock pin of a sequential component in the set of sequential components;
identify a subset of nets in the set of nets that provide toggle signals, wherein the toggle signals transition between two different values;
for each net in the subset of nets, determine one or more toggle cover properties for the net based on the toggle signals;
determine a sequential depth of at least one net in the subset of nets;
perform, by a processing device, sign off for verification of the circuit design based on the toggle cover properties and the sequential depth of the at least one net.

14. The non-transitory computer readable medium of claim 13, wherein at least one toggle cover property of a net in the subset of nets has a value of a covered status, indicating that the toggle signal of the net is activating the clock gating logic.

15. The non-transitory computer readable medium of claim 14, further comprising additional instructions, which when executed by the processor, cause the processor to:
determine a maximum sequential depth of nets that have the covered status, wherein performing sign off for the clock gating verification is based on a criterion associated with the maximum depth of nets that have the covered status.

16. The non-transitory computer readable medium of claim 13, wherein at least one toggle cover property of a net in the subset of nets has a value of an uncovered status, indicating that the toggle signal of the net does not activate the clock gating logic.

17. The non-transitory computer readable medium of claim 13, wherein at least one toggle cover property of a net in the subset of nets has a value of an inconclusive status, indicating that it is unknown whether the toggle signal of the net is activating the clock gating logic.

18. The non-transitory computer readable medium of claim 17, further comprising additional instructions, which when executed by the processor, cause the processor to:
perform sequential equivalence checking (SEQ) on the circuit design to determine SEQ assert properties of the circuit design; and
determine a minimum depth of SEQ assert properties that have inconclusive status, wherein performing sign off for the clock gating verification is further based on a criterion associated with the minimum depth.

19. The non-transitory computer readable medium of claim 13, wherein each toggle signal is a first signal that transitions from a signal value of 0 to a signal value of 1, or a second signal that transitions from a signal value of 1 to a signal value of 0.

20. A system comprising:
a memory storing instructions; and
a processor, coupled with the memory and to execute the instructions, the instructions when executed cause the processor to perform:
identify a set of sequential components in a circuit design having clock gating logic implemented thereon;
identify a set of nets in the circuit design, each net of the set of nets provides a signal to a clock pin of a sequential component in the set of sequential components;

identify a subset of nets in the set of nets that provide toggle signals, wherein the toggle signals transition between two different values;

for each net in the subset of nets, determine one or more toggle cover properties for the net based on the toggle signals;

determine a sequential depth of at least one net in the subset of nets;

perform, by a processing device, sign off for verification of the circuit design based on the toggle cover properties and the sequential depth of the at least one net.

* * * * *